April 13, 1926.
H. L. INGERSOLL
1,580,734
CONTROLLING APPARATUS FOR BOOSTER MOTORS
Filed Oct. 15, 1920　　4 Sheets-Sheet 1
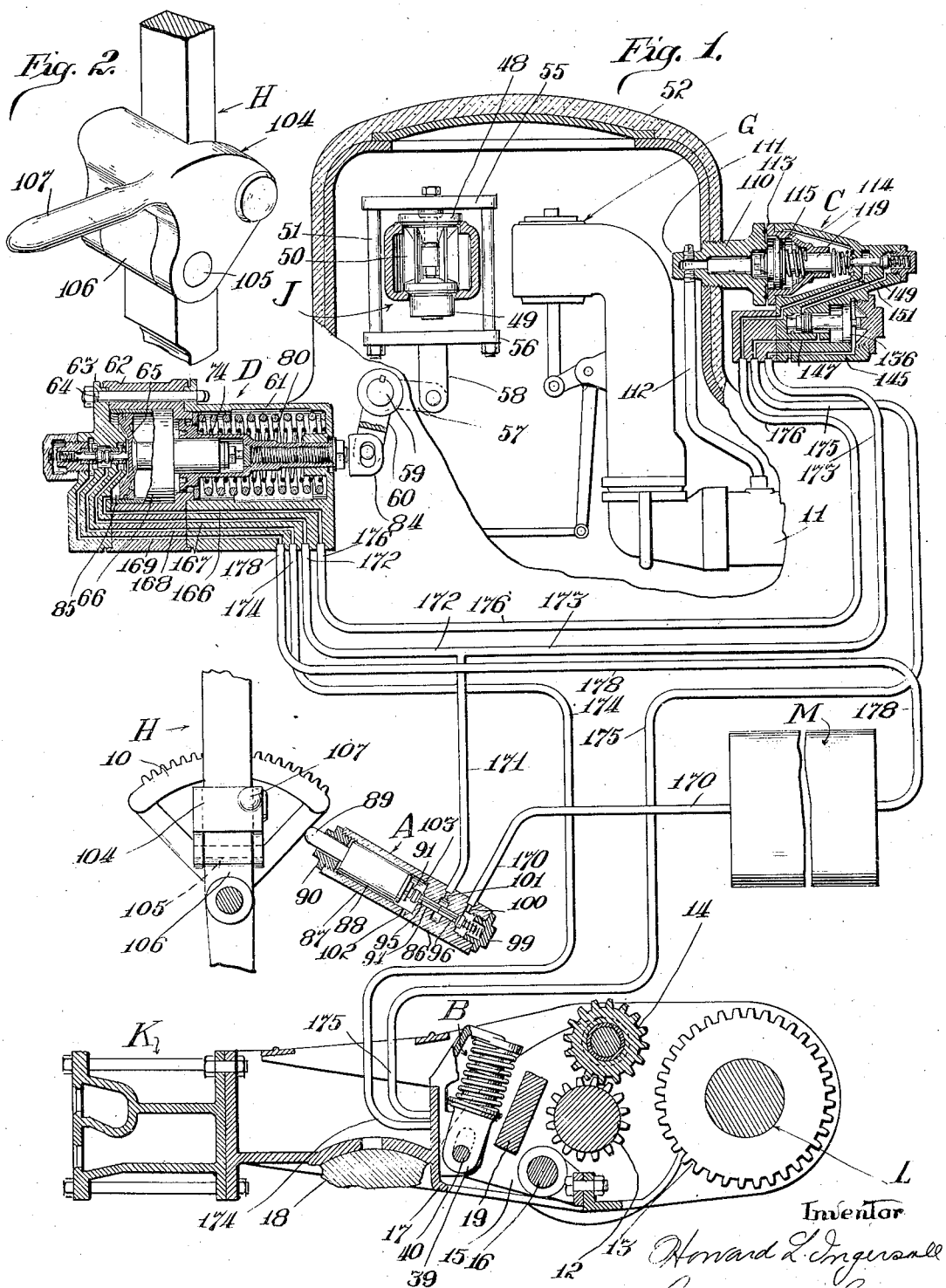

April 13, 1926.
H. L. INGERSOLL
1,580,734
CONTROLLING APPARATUS FOR BOOSTER MOTORS
Filed Oct. 15, 1920  4 Sheets-Sheet 2
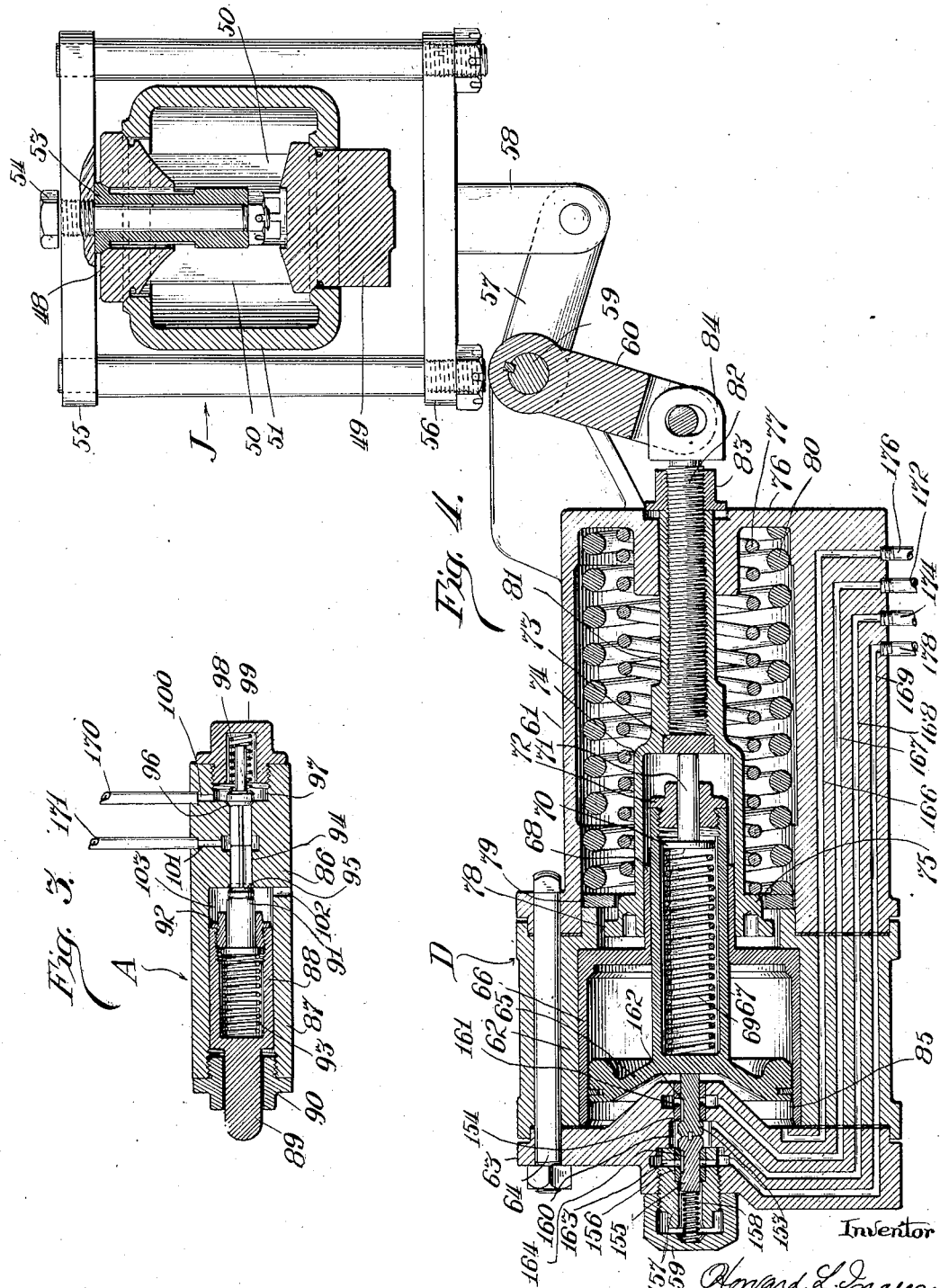
Inventor
Howard L. Ingersoll
By Symmeswest & Lechner
Attorneys.

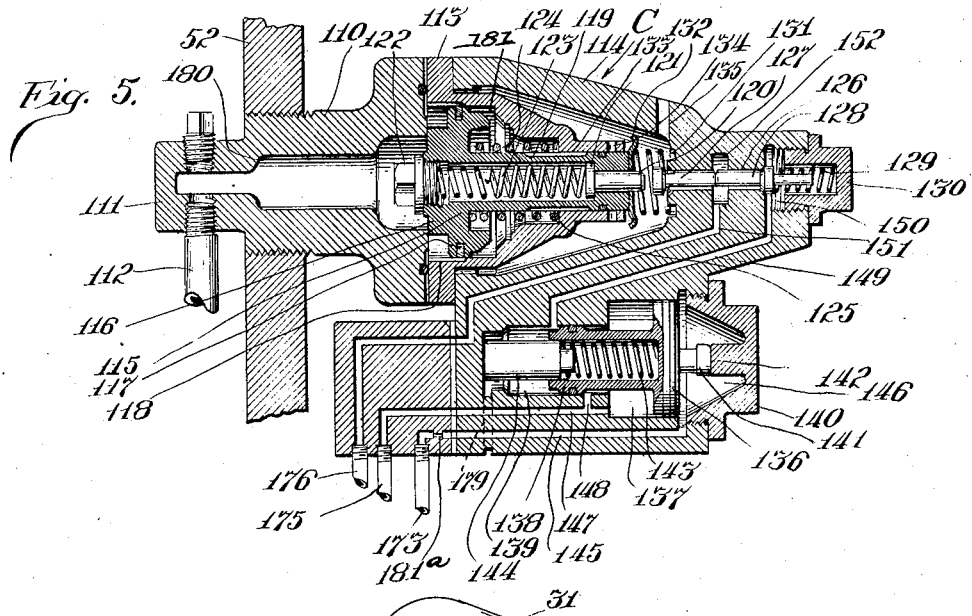
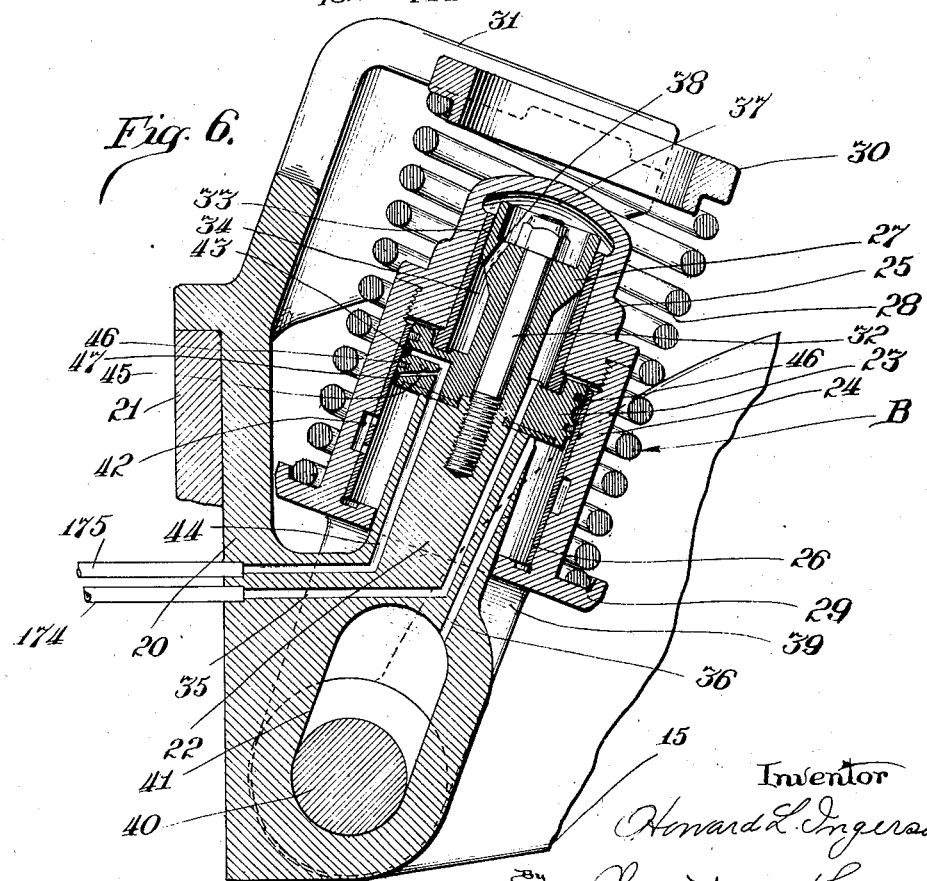

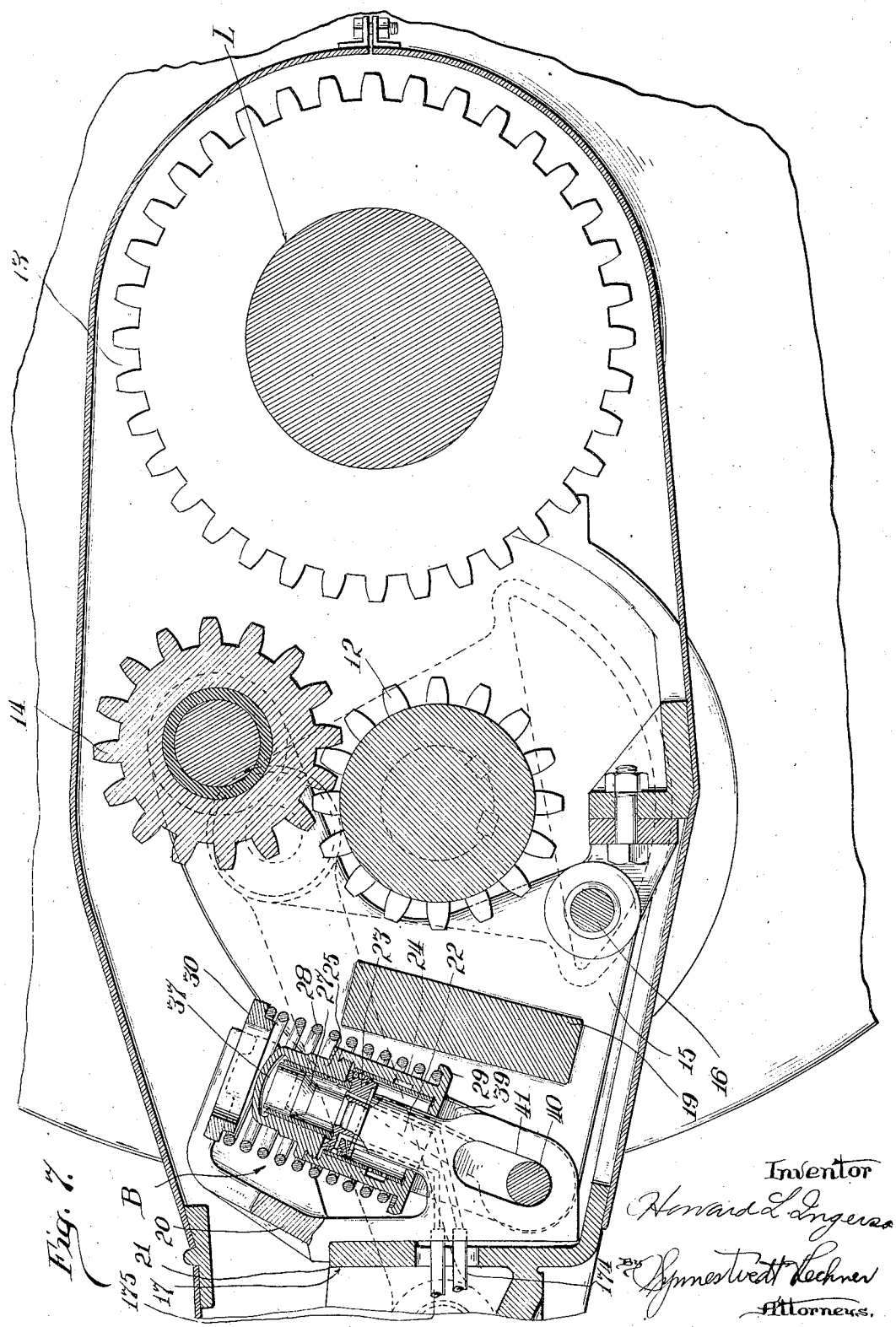

Patented Apr. 13, 1926.

1,580,734

UNITED STATES PATENT OFFICE.

HOWARD L. INGERSOLL, OF WHITE PLAINS, NEW YORK.

CONTROLLING APPARATUS FOR BOOSTER MOTORS.

Application filed October 15, 1920. Serial No. 417,215.

*To all whom it may concern:*

Be it known that I, HOWARD L. INGERSOLL, a citizen of the United States, residing at White Plains, in the county of Westchester and State of New York, have invented certain new and useful Improvements in Controlling Apparatus for Booster Motors, of which the following is a specification.

My invention relates to a controlling apparatus for locomotive booster motors of the general character described in Patent No. 1,339,395, granted to me on May 11, 1920. The purpose of the booster motor, it may be said, is to aid the main driving means of the locomotive in getting the locomotive under way and in propelling it at relatively low speeds, either when the locomotive is first started up or on heavy grades, and as the booster is not designed to operate at high speeds it is important that after a locomotive has reached a speed of a certain number of miles per hour, say ten or twelve, the steam or other motive power employed should be cut off from the booster and the booster disengaged from the axle of the locomotive which it drives during periods of operation. In the patent referred to this takes place when the engine man pulls back his reverse lever to shorten the valve movement of the locomotive, which will ordinarily be done when the locomotive attains about the speed mentioned. In application Serial No. 302,321, filed June 6, 1919, I have disclosed an improvement upon the apparatus of Patent No. 1,339,395, consisting of an arrangement whereby, when the booster is put into operation, it is connected with the locomotive axle before receiving steam, and when it is cut out the supply of steam is first shut off and the booster thereafter disconnected from said axle. In both these embodiments of the invention the booster control apparatus (which is preferably operated by compressed air) functions to shut off steam from the booster whenever the main throttle of the locomotive is closed or throttled down to put the main driving means out of operation. The purpose of this is to prevent the engineer from iadvertently or interntionally using the booster alone for propelling the locomotive, a service which the booster is not designed to perform. This arrangement, however, involves a disadvantage in case the main drivers slip, in starting up the locomotive, and the engine man "pinches" the locomotive by momentarily throttling down the supply of steam to the engine, because the momentary stoppage of the main driving means involves stopping the operation of the booster; whereas the booster, if properly constructed, will be quite capable of carrying the load during the interval of time which will elapse before the engine man reopens the main throttle, and, if the booster be thus kept in operation, it will better assist the main driving means in getting the locomotive under way.

It is one of the principal objects of the present invention to provide a controlling mechanism for the booster motor which will allow it to function while the main driving means is being "pinched" but which will, nevertheless, put the booster out of operation, automatically, in case the main driving means ceases to operate for any appreciable period of time.

The invention also contemplates an arrangement whereby the booster motor may be cut out at the will of the engine man, without either stopping the operation of the main driving means or hooking up the reverse lever.

A further object of the invention is to provide an improved form of mechanism for operating the booster throttle valve whereby steam is applied to the booster at first in relatively small quantities which are increased as the locomotive gets under way. The purpose of this is primarily to prevent the slipping of the booster driven wheels, racing of the booster and possible ripping of the clutch gears which might occur if full steam pressure were admitted to the cylinders at the start. The arrangement provided for accomplishing this result also prevents shocks to the valve and its operating mechanism. Another object is to delay momentarily the application of steam to the booster after it has been entrained with the axle it is designed to drive, so that the booster will not be put into action before the main driving means of the locomotive is operating. The invention has for a further object to generally improve and simplify the various devices employed for controlling the booster motor through manipulation, primarily of the controlling elements of the main driving means, to-wit, the reverse and main throttle levers.

The invention is illustrated, in a preferred embodiment, in the accompanying drawings, wherein—

Fig. 1 is a diagrammatic illustration of the entire apparatus, parts being shown fragmentarily.

Fig. 2 is a detail view, in perspective, of the manual controller for the booster which is located on the locomotive reverse lever.

Fig. 3 is a sectional view of the primary controlling valve of the booster control system.

Fig. 4 is a similar view of the booster throttle valve and its operating motor.

Fig. 5 is a similar view of the secondary controlling device of the booster control system.

Fig. 6 is a similar view of the motor for connecting and disconnecting the booster with the axle which it is designed to drive, and Fig. 7 is a sectional view of the booster entraining mechanism and associated parts.

Like characters of reference designate like parts in the several figures of the drawings.

Referring first to Fig. 1, the following are the component parts of the booster control system forming the subject matter of this application: A is the primary controlling device operated when the reverse lever H is moved to its extreme forward position on the quadrant 10 to admit air pressure from the air reservoir M to the booster control system. B is the motor for entraining the booster motor, which is indicated at K, with the axle L of the locomotive, this axle being preferably the axle of the trailer truck. C is a governing device operated by steam pressure taken from the main dry pipe 11 of the locomotive when the main throttle G is opened, and the main driving means of the locomotive put into action, to admit air pressure to the operating motor D of the booster throttle valve J. The governing device C is constructed, as will be hereinafter described, so that it requires a considerable steam pressure from the locomotive dry pipe, say a pressure of seventy pounds, to bring about the movement of the valve which admits air pressure to motor D, but so that said valve will remain open until the steam pressure in said locomotive dry pipe has fallen to a very much reduced pressure, say five pounds. When this minimum pressure is reached the governing device C is actuated to shut off steam from the booster. The arrangement is such, therefore, that the locomotive engineer may throttle down his supply of steam to the main driving means in case the main drivers slip and spin without interrupting the continued operation of the booster, but any stoppage, for an appreciable period of time of the main driving means of the locomotive, will involve, automatically, stopping the operation of the booster.

The booster entraining mechanism is preferably constructed as follows: 12 designates a gear wheel driven by the booster K, 13 is a gear wheel on the locomotive axle L, and 14 is a pinion adapted to mesh with gears 12 and 13 and mounted on a rocking member 15 pivoted at 16 to the booster motor frame 17 which, it will be understood, is suitably supported on the trailer truck of the locomotive, a portion of which is indicated at 18 (Fig. 1). The rocking member is weighted, as shown at 19, so that normally gear 14 is out of mesh with gear 13. The rocking member 15 is moved to mesh the gear 14 with gear 13 by means of the air and spring motor B shown in detail in Fig. 6.

Entraining motor B is constructed as follows: 20 is a bracket or supporting member secured to a flange 21 on the booster motor frame 17 and formed with a stem 22 to which is fixed a piston 23. 24 is a movable cylinder to which is connected a smaller cylinder 25. 27 is a piston of smaller diameter fixed to piston 23. A coiled spring 28 is interposed between a flange 29 on the cylinder 24 and a spring seat 30 on an arm 31 of bracket member 20. The pistons 23, 27 are secured to stem 22 by a bolt 32 and are provided with bushings 26, 33, respectively. Air is admitted into the space 34 above piston 23 through a port 35 formed in the bracket member 20 and piston 23. 36 is an exhaust port from cylinder 24. The air passes from the space 34 into the space 37 above the upper end 27 of the piston through a port 38. The cylinder structure 24, 25 is thereupon raised, compressing spring 28. The cylinder 24 is formed with depending webs 39 engaged by means of a cross pin 40, which moves in a slot 41 in the bracket member 20, with the rocking member 15 which, when cylinder 24 rises under air pressure, is rocked to bring gear 14 into mesh with gear 13. When this occurs air pressure from the space 34 passes through by-pass 42 into a circumferential port 43 in the piston and from there into an outlet duct 44 in the piston 23 and bracket member 20. 45 is a bleeding port extending from the upper end of duct 43 past the lower one of the piston rings 46 of piston 23 to a space 47 formed by having the lower portion of the piston 23 of reduced diameter, the purpose of which will be described hereafter.

The booster throttle valve J is composed of an upper head 48, a lower head 49 and intervening wings 50 (Fig. 4) and is arranged to extend through a casing 51 at the end of the booster dry pipe (not shown), the valve being located within the steam dome 52 of the locomotive. Arranged to move vertically within the head 48 of valve J and to seat thereon, is an auxiliary valve 53 constructed so that when raised it will admit steam through and under the upper head 48 of valve J. The auxiliary valve is fastened by bolt 54 to the upper cross piece 55 of a rectangular yoke structure 56 which extends around valve J and its casing 51. The yoke is raised by means of a rock arm 57, and link 58, the rock arm being secured to a rock shaft 59 extending through the steam dome and being provided outside of the same with a rock arm 60 adapted to be engaged by the driven element of the booster throttle valve operating motor D.

The booster throttle valve operating motor D is preferably constructed as follows: 61 is a casing member, 62 a cylinder member and 63 a head for the latter, the parts being held together by bolts 64. 65 is a piston arranged within a bushing 66 in cylinder 62. The piston has a hollow stem 67 guided by an extension 68, of reduced diameter, of bushing 66. Within the hollow stem is a coiled spring 69 interposed between the piston 65 and the head 70 of a plunger 71 which latter extends through a plug 72 in the end of the hollow stem 67 and bears against a block 73 set into a hollow cylindrical follower 74 which surrounds the smaller end 68 of the bushing 66. This follower is formed with an annular shoulder 75 between which and the head 76 of cylinder 61 is interposed a coiled spring 77. Formed on the annular shoulder 75 of the follower 74 is a flange 78 which is adapted to bear against a ring 79 between which and head 76 is interposed a coiled spring 80. The outer end 81 of the follower 74 is hollow and internally threaded to receive a screw 82 adapted to be held in set position by nut 83. The end of the screw is provided with a clevis 84 for engaging the rocking arm 60 for operating the booster throttle valve. When air pressure is admitted to the space 85 between head 63 and piston 65 the latter is moved to open the booster throttle valve J.

Associated with the motor D just described, are certain valves and ducts which, however, will be most conveniently described in connection with the controlling mechanisms for governing the application of air pressure to motors B and D.

The primary controlling device A for the booster control system is constructed as follows: 86 is a member formed at one end with a cylinder 87 in which is arranged a hollow plunger 88 formed with a stud 89 the end of which is preferably rounded, which stud extends through a cap piece 90 on the end of the cylinder. Projecting from the other end of the plunger 88 is a stud 91 which is held in place by a gland 92 screwed into the plunger. 93 is a coiled spring bearing against stud 91. The member 86 is formed with a port 94 in which are arranged a pair of valves 95, 96 which bear one against the other so that when one valve is seated the other is unseated. Valve 96 is arranged in a valve chamber 97 formed in the end of the member 86, the valve being pressed towards its seat by coiled spring 98 seated in a cap piece 99. When plunger 88 is forced inwardly air may pass through the controller A from a port 100 through chamber 97 and port 94 and out port 101. 102 is an exhaust port for the chamber 103 within cylinder 87.

The reverse lever H does not itself contact with the stud 89 on plunger 88, contact being made between these elements by a manually operated controlling member which, in order that the booster be utilized when the locomotive is started, has to be put in its operative position by the engineer. This member, designated 104, is pivoted by a pin 105 to a lug 106 on the reverse lever and has a handle 107. The controlling member 104 may be moved into position either as the reverse lever is put into the corner or after it has been put into that position. When the reverse lever is hooked up member 104 will fall by gravity to its inoperative position. Said member may be moved out from between the reverse lever and stud 89 while the reverse lever is in its full forward position. The manually operated controlling member herein shown and described is substantially the same as disclosed in the application of William M. Sheehan, filed July 14, 1919, Serial No. 310,701 (renewed November 8, 1920, as Serial No. 422,701), and is not claimed herein except in combination with the novel features of the herein described apparatus.

The secondary controlling device C of the booster motor controlling system is constructed as follows: 110 (Fig. 5) is a nipple set into the side of the steam dome 52 to an inwardly projecting portion 111 of which is connected a pipe 112 which extends from the main dry pipe 11 of the locomotive. Casing members 113, 114 are secured to the nipple 110. Arranged within casing member 113 is a piston 115 having a portion 116 of reduced diameter which bears against the end of the nipple. The piston 115 is provided with a packing ring 117 and casing member 113 is counterbored at 118 to a point beyond ring 117 when the piston is in its normal position. The piston has a hollow stem 119 in which is arranged a stud 120 between the head 121 of which and a plug 122 in piston 115 is arranged a coiled spring 123. A spring 124 is interposed between the piston 115 and an internal shoulder 125 on casing member 113. The outer end of casing member 114 is formed with a port 126 in which are disposed two valves 127, 128 arranged so that when one is seated the other is unseated, valve 128 being normally closed by a spring 129 arranged in a cap piece 130. A spring 131 is interposed between a spring seat 132 and the end of casing member 114. Piston 115 is moved to seat valve 127 and unseat valve 128 when the steam pressure against the piston is sufficient to overcome the force exerted by springs 124 and 131. 133 is a port in the working surface of piston 119 which registers with ports 134 in casing member 113 when piston structure 115, 119 is moved by steam pressure. 135 is an exhaust port to the atmosphere through casing 114.

In the lower part of the casing member 114 is arranged a piston valve consisting of a double piston having a head 136 operating in a cylinder 137 and a head 138 operating in a cylinder 139 of smaller diameter. 140 is a cap closing the end of cylinder 137, piston 136 having a stud 141 adapted to bear against a projection 142 on the inside of the cap. A coiled spring 143 is arranged within the smaller end of piston valve 136, which is hollow, and bears against the end of a guide stud 144 on which the piston valve slides. 145 is a duct for introducing compressed air into the space 146 for the purpose of moving piston valve 136, 138 to the left. 147 is a duct leading to the space 137 on the other side of piston 136, this duct having a branch 148 which is put into communication with a duct 149 leading from the space 139 when the piston valve 136, 138 is in its left hand position, duct 149 leading to the chamber 150 in which valve 128 is located. 151 is a duct leading from a chamber 152 forming part of duct 126. When valves 127, 128 are shifted to the right by steam pressure on piston 115 air can pass from duct 149 into duct 151.

The controlling valves and ducts associated with the motor D are constructed and arranged as follows: A valve 153 is arranged in a bushing 154 fixed in the head 63 of cylinder 62, the valve projecting from the bushing so as to be engaged by piston 65. A second valve 155 is arranged to slide in bushing 156, 157 in the head 63 and is forced against valve 153 by a coiled spring 158 which is seated against a cap piece 159 closing bushing 157. Valves 153, 155 project into a chamber 160. Valve 155 is seated when piston 65 is in its normal position, at which time valve 153 is unseated to put a port 161 in communication through a port 162 formed in valve 153 with chamber 160. When the position of the valves is reversed, which occurs when piston 65 is under air pressure, a port 163 is in communication with chamber 160 through port 164 in valve 155. 166 is a duct leading to the space 85 between the head 63 and piston 65. 167 is a duct leading to port 161. 168 is a duct leading from chamber 160. 169 is a duct leading to port 163.

The controlling mechanisms above described are connected by piping as follows: 170 is a pipe leading from the pressure reservoir M to duct 100 of the controlling device A. Pipe 171 leads from the duct 101 of controlling device A and has two branches, one, designated 172, which leads to duct 167 of motor D, the other, designated 173, leading to duct 145 of the controlling device C. A pipe 174 connects duct 168 with the inlet duct 35 of motor B. The outlet duct 44 of motor B is connected by pipe 175 with the duct 147 of controller C. A pipe 176 connects duct 151 of controller C with duct 166 of motor D. 178 is a pipe leading from the pressure reservoir M to duct 169.

The operation of the controlling apparatus above described is as follows:

To start the locomotive and use the booster as an auxiliary driving means the reverse lever H is put into its extreme forward position (to the right of Fig. 1), the manual controller 104 is rocked by raising handle 107 to interpose this device between the reverse lever and controlling device A, and the main throttle G of the locomotive is opened. Valve 95 of the controller A is seated and valve 96 unseated and compressed air from the reservoir M takes the following course through the controlling mechanism: from reservoir M through pipe 170 and ports 100, 94 and 101 to pipe 171. From pipe 171 the air passes through branch pipes 172 and 173. Following its course from pipe 172 the air passes into duct 167 of motor D, port 161, port 162, chamber 160 and out through duct 168 to pipe 174, thence to the inlet duct 35 of entraining motor B, causing the cylinder 24, 25 to be raised to rock member 15 and mesh gear 14 with gear 13 on the locomotive axle L. The booster is now entrained with the locomotive and ready to function as a driving factor when supplied with steam.

Following the course of the air from pipe 171 through pipe 173, the air passes into a duct 145 in controller C and thence to space 146 where the pressure against piston valve 136, 138 moves the same to the left, putting port 148 in communication with port 149. When the cylinder 24, 25 of motor B has reached the end of its travel port 46 registers with the lower end of by-pass 42, the upper end of which stands above piston 23. Air from the space 34 passes through the by-pass 42 into port 43 and duct 44 to pipe 175 and thence to duct 147 in controller C and through port 148 to duct 149 and into the space 150 where the air is blocked by valve 128 until steam has been admitted to the main dry pipe 11 of the locomotive with sufficient pressure to actuate the steam actuated portion of controller C. Steam pressure from pipe 11 passes through pipe 112 into the space 180, exerting pressure against the exposed portion of the piston 115. This area is comparatively small so that it requires some considerable steam pressure to move the piston against the force of spring 124. Assuming that the piston is moved slightly from its bearing on the face of nipple 110 there will be a leakage of steam around the piston through port 118 and thus steam is trapped in the space 181, balancing, to a certain extent, the steam pressure against the face of the piston. The pressure in space 180 will have to be considerable, say, seventy pounds, before the plunger 120 of piston 115 is brought against valve 127. This means that the steam actuated portion of controller C will not function until the main driving means of the locomotive is in full operation. When this occurs piston 115 is moved completely to the right, seating against the seat provided by casing member 113 and moving valve 127 to seat the same and valve 128 to unseat this valve. Air may now pass from chamber 150 through ports 126 and 152 into duct 151 and from there through pipe 176 and duct 166 in the motor D to the space 85 between piston 65 to motor D and the head 63 of its cylinder. Piston 65 is moved to the right successively compressing springs 69, 77 and 80 which are of progressively increasing stiffness. Spring 69 must be compressed to bring plug 72 against the follower 74 before any opening of the booster throttle valve takes place. This delay prevents the booster from being put into operation until the locomotive engine is under way. When the air pressure back of the piston 65 has been built up sufficiently to compress spring 77 the auxiliary valve 53 is raised to admit a small amount of steam to the booster. The further movement of the piston is retarded momentarily by spring 80, the resistance of which must be overcome by the further building up of pressure in space 85 before the yoke frame 56 is brought against the main valve to open the same. By this arrangement of graduated resistances steam is admitted gradually to the booster engine so as to avoid starting the booster with such force as to cause the wheels which it drives to slip or to strip the clutch gears. Moreover, injurious shocks on the valve and associated mechanism, which might occur if the valve were opened suddenly as a whole, are avoided. The movement of piston 65 under air pressure in chamber 85 by releasing valve 153 allows this valve to be seated and valve 155 to be unseated through action of spring 158. The flow of air from duct 167 to duct 168 is stopped, but this does not affect the functioning of the controlling mechanism because air will now pass from the reservoir M through pipe 178, duct 169 of motor D, port 163, port 164 in valve 155, chamber 160 and from there into duct 168, whence it follows the course previously outlined. The booster is now in operation and functions as a driving factor of the locomotive (1) until the reverse lever is hooked up; or (2) until the manual controlling device 104 is turned to its normal position out of contact with stud 89 of controller A; or (3) until the main throttle valve of the locomotive is closed and the pressure in the dry pipe 11 has fallen to a relatively low point, say five pounds. In the first two cases the booster is disentrained from the locomotive as well as put out of operation. In the third case, steam is shut off from the booster but it is not disentrained.

Let us assume that the reverse lever is either hooked up, which in the ordinary operation of the locomotive will be done to shorten the valve movement when the locomotive attains a speed of about ten or twelve miles per hour, or that without moving the reverse lever the engineer shifts the manual controller 104 to reverse the valves of controller A. In either case the operation of the controlling mechanism is as follows: Communication is closed between pipe 170 connected with the reservoir M and pipes 171, 172, 173. The space 146 in controller C exhausts through duct 145, pipe 173, pipe 171, port 94 of controller A and exhaust port 102. The duct 145 is preferably constricted at 181$^a$ so that movement of the piston valve 136, 138 is gradual. The space 139 back of the piston valve is open to the atmosphere through exhaust port 179 to allow free movement of the piston valve. The movement, to its normal position, of piston valve 136, 138 which is brought about by spring 143 and also by the pressure against the piston through port 147, shuts off duct 149 from port 147, allowing the air in the space 85 of motor D, duct 166, pipe 176, duct 151 of controller C to exhaust through port 126, duct 149 and duct 179. The motor D now operates to close the main booster throttle valve J and thereafter its auxiliary valve 53. The valves 153, 155 associated with motor D are restored to their normal position shutting off communication between pipe 178 and duct 169 from duct 168 and pipe 174 which supplies the motor B with pressure (the indirect supply through pipes 170, 171, 172 and ducts 167 being interrupted at controller A) and air in the motor B exhausts through port 38, duct 35, pipe 174, ducts 168, 169, pipes 172, 171 and through controller A. The booster motor is now out of operation and disentrained from the locomotive, the disentrainment not having taken place until after steam was cut off from the booster.

If the engineer closes his main throttle and leaves the same closed for an appreciable period of time, steam will be cut off from the booster without, however, involving the disentrainment of the booster from the axle with which it is connected. However, the engineer may throttle the steam to the main driving means, (for example, to momentarily stop the locomotive engine in case the main drivers should slip) without interrupting the continued functioning of the booster. This results from the construction of controller C.

Let us assume that the engineer throttles down the steam to the main driving means of the locomotive by moving the main throttle valve toward its seat but without quite closing the valve so that a certain amount of steam is admitted to the dry pipe 11. The pressure in chamber 180 of controller C will fall, but until this pressure is very considerably reduced, in practice to about five pounds, the piston 115 will remain in its right hand position under a pressure very much less than the pressure required to move the piston to that position. In its right hand position the piston seats against casing 113 so as to prevent any appreciable escape of steam around the piston. If there is any leakage it passes to the atmosphere through ports 133, 134, 135. Whatever pressure there is in chamber 180 is exerted against the whole area of piston 115 and the other side of the piston is exposed only to atmospheric pressure. If, however, the pressure in the dry pipe falls below the minimum for which controller C is designed to operate, below five pounds, for example, which will occur, of course, if the engineer closes his throttle completely for any appreciable time, the controller C will thereupon operate to close the booster throttle J as follows: Valves 127, 128 released by piston 115 will assume their normal positions. Valve 128 closes communication between duct 149 and duct 151 while valve 127 opens duct 151 to the atmosphere through port 135. The pressure space 85 in motor D will now exhaust through duct 166, pipe 176 and duct 151 which, as just stated, is open to the atmosphere and the motor D will function to close the booster throttle J. The shifting of valve 153, 155 resulting from the movement of piston 55 of motor D does not bring about any change in the parts of the controlling device governing the booster entraining motor B so that this motor remains under pressure and the booster entrained with the locomotive until reverse lever H is hooked back or the manual controller 104 shifted out of contact with controlling device A.

I claim:

1. In combination with the main driving means of a locomotive, a booster motor for aiding the main driving means in starting the locomotive and propelling the same at low speeds, and means for controlling the booster which functions to prevent the booster from operating except when the main driving means is employed while permitting momentary shutting off of power from the main driving means without interruption of the booster operation.

2. In combination with the main driving means of a steam propelled locomotive and its throttle valve, a booster motor for aiding the main driving means in starting the locomotive and propelling the same at low speeds, and means for controlling the booster which functions to prevent the booster from operating except when the main driving means is employed, while permitting the locomotive throttle valve to be moved to momentarily throttle the supply of steam to the main driving means without interruption of the booster operation.

3. In combination with the main driving means of a steam propelled locomotive and its throttle valve, a booster motor to aid the main driving means in starting the locomotive and propelling the same at low speeds, and controlling means for the booster which functions to set the booster in operation only when the main driving means is started, and to put the booster out of operation when said throttle valve is closed while permitting said valve to momentarily throttle steam to the main driving means without affecting the continued operation of the booster.

4. In combination with the main driving means of a steam propelled locomotive and its throttle valve and reverse lever, a booster motor to aid the main driving means in starting the locomotive and propelling the same at low speeds, and controlling means for the booster which functions to set the booster in operation only when the reverse lever is in starting position and the throttle valve open and to put the booster out of operation when said throttle valve is closed or the reverse lever moved from the starting position while permitting said throttle valve to be moved to momentarily throttle steam to the main driving means without affecting the continued operation of the booster.

5. In combination with the main driving means of a steam propelled locomotive, a booster motor to aid the main driving means in starting the locomotive and propelling the same at low speeds, and means responsive to pressure of steam supplied to the main driving means which puts the booster out of operation when steam is shut off from the main driving means while permitting the booster to continue operating when the steam supplied to the main driving means is throttled down.

6. In combination with the main driving means of a steam propelled locomotive, a booster motor to aid the main driving means in starting the locomotive and propelling the same at low speeds, and means responsive to pressure of steam supplied to the main driving means which prevents the booster from operating when the main driving means is not in use while permitting steam supplied to the main driving means to be throttled without interruption of the continued operation of the booster.

7. In combination with the main driving means of a steam propelled locomotive, a booster motor to aid the main driving means in starting the locomotive and propelling the same at low speeds, and means responsive to pressure of steam supplied to the main driving means which prevents the booster from being put into operation except with a working steam pressure applied to the main driving means while permitting the booster to continue operation when the steam pressure to the main driving means is diminished.

8. In combination with the main driving means of a locomotive and a booster motor to aid the same, common controlling mechanism whereby the booster is put into and out of operation when the main driving means is put into and out of operation but which permits operation of the main driving means to be momentarily interrupted without interruption of the operation of the booster.

9. In combination with the main driving means of a locomotive and a booster motor to aid the same which is normally disentrained from the locomotive, and common controlling mechanism whereby the booster motor can be entrained and put into operation only when the main driving means is put into operation, and is put out of operation when the main driving means is put out of operation, said controlling mechanism comprising means whereby the booster may be put out of operation independently of the main driving means.

10. In combination with the main driving means of a steam propelled locomotive and a booster motor for aiding the main driving means in starting the locomotive and propelling the same at low speeds, a fluid pressure operated mechanism for setting the booster motor in operation, a valve to shut off supply of fluid pressure to said controlling mechanism, and means responsive to steam pressure supplied to the main driving means which operates to open said valve only at high steam pressure and to maintain the same open at a much reduced pressure.

11. In combination with the main driving means of a steam propelled locomotive and its dry pipe and throttle valve, a booster motor to aid the main driving means in starting the locomotive and propelling the same at low speeds, means responsive to pressure in said dry pipe which functions to permit the booster to be set in operation only when the throttle valve is open to admit a working pressure into the dry pipe while maintaining the booster in operation until such steam pressure is considerably reduced.

12. In combination with the main driving means of a steam propelled locomotive and its dry pipe and throttle valve, a booster motor to aid the main driving means in starting the locomotive and propelling the same at low speeds, a fluid pressure actuated controlling mechanism for setting the booster motor in operation, a valve to shut off pressure fluid from said mechanism, and means responsive to pressure in the dry pipe which opens said valve at high pressure therein and closes the valve only at a much reduced pressure in said dry pipe.

13. In combination with the main driving means of a locomotive, a steam operated booster motor, a throttle valve to control the admission of steam to the booster motor, an auxiliary valve to admit a relatively small amount of steam past the throttle valve, and mechanism for first opening the auxiliary valve and afterward said throttle valve.

14. In combination with the main driving means of a locomotive, a steam operated booster motor, a throttle valve to control the admission of steam to the booster motor, an auxiliary valve arranged in the throttle valve to admit a relatively small amount of steam through said throttle valve, and mechanism for first opening the auxiliary valve and afterward the throttle valve.

15. In combination with the main driving means of a locomotive, a steam operated booster motor, a throttle valve to control the admission of steam to the booster motor, an auxiliary valve to admit a relatively small amount of steam past the throttle valve, and mechanism the actuation of which is conditioned upon the manipulation of the controlling devices of the main driving means for first opening the auxiliary valve and thereafter said throttle valve.

16. In combination with the main driving means of a locomotive, a steam operated booster motor, a throttle valve to control the admission of steam to the booster motor, an auxiliary valve to admit a relatively small amount of steam past the throttle valve, and fluid pressure operated mechanism the actuation of which is conditioned upon the manipulation of the controlling devices of the main driving means for first opening the auxiliary valve and thereafter said throttle valve.

17. In combination with the main driving means of a locomotive and a steam actuated booster motor, a steam supply pipe for the booster provided with a valve casing, a throttle valve arranged to extend through said valve casing from top to bottom, an auxiliary valve arranged in the throttle valve and constructed to admit steam to said casing when the auxiliary valve is raised, and a yoke adapted to first raise the auxiliary valve and afterward said throttle valve.

18. In combination with the main driving means of a locomotive and a steam actuated booster motor, a steam supply pipe for the booster provided with a valve casing, a throttle valve arranged to extend through said valve casing from top to bottom, an auxiliary valve arranged in the throttle valve and constructed to admit steam to said casing when the auxiliary valve is raised, and a yoke extending around said valves to the top of which the auxiliary valve is connected and the bottom of which is adapted to engage and raise the throttle valve after the auxiliary valve has been raised.

19. In combination with the main driving means of a locomotive and its reverse lever and throttle valve; a booster motor to aid the main driving means; an entraining motor B for entraining the booster motor with the locomotive, which is actuated by compressed air; a controlling device A actuated by the reverse lever for admitting air to and cutting it from controller A; a booster throttle valve; an air motor D for opening and closing the booster throttle valve; a controlling device C for controlling the application of air to motor D, the operation of which is conditioned by the presence and absence of air pressure passing controller A and which comprises a valve actuated by pressure of steam supplied to the main driving means for controlling, additionally, the flow of air to motor D, which steam pressure actuated means responds only to a working steam pressure in the main driving means on the actuation of said controller C to put the booster in operation but will operate in the opposite direction to put the booster out of operation only with a much reduced steam pressure in the main driving means.

20. In combination with the main driving means of a locomotive and its reverse lever and throttle valve, a booster motor having a throttle valve and a fluid operated controlling mechanism for the booster motor throttle comprising the primary controller A, the entraining motor B, motor D for operating the booster throttle valve, and the steam actuated valve C for controlling the operation of motor D.

21. In combination with the main driving means of a locomotive and its reverse lever and throttle valve, a booster motor having a throttle valve and a fluid operated controlling mechanism for the booster motor throttle comprising the primary controller A, the entraining motor B, motor D for operating the booster throttle valve, the steam actuated valve C for controlling the operation of motor D, and a manually operated member 104 on the reverse lever adapted to be interposed between the reverse lever and the primary controller A.

22. In combination with the main driving means of a locomotive, a booster motor for said locomotive and controlling means for the booster motor which, when actuated, automatically supplies the booster motor with the motive power first in relatively small quantities and thereafter in increased quantities.

23. In combination with the main driving means of a locomotive, a booster motor for the locomotive and controlling means for the booster motor automatically actuated through operation of the main driving means which when actuated automatically supplies the booster motor with motive power first in relatively small quantities and thereafter in increased quantities.

24. In combination with the main driving means of a locomotive, a steam operated booster motor for the locomotive and controlling means for the booster motor which when actuated automatically supplies the booster motor with steam, first in relatively small quantities and thereafter in increased quantities.

25. In combination with the main driving means of a locomotive, a steam operated booster motor for the locomotive, controlling means for the booster motor automatically actuated through operation of the main driving means which, when actuated, automatically supplies the booster motor with steam first in relatively small quantities and thereafter in increased quantities.

26. In combination with the main driving means of a locomotive, a booster motor for the locomotive and a fluid pressure operated controlling means for the booster having springs of graduated resistance against which the booster operates for supplying the booster motor with motive power first in relatively small quantities and thereafter in larger quantities.

27. In combination with the main driving means of a locomotive, a booster motor for the locomotive, and a fluid pressure operated controlling means for supplying the booster motor with motive power, which controlling means is provided with a spring against which the fluid pressure operates initially to delay the application of motive power to the booster.

28. In combination with the main driving means of a locomotive, a booster motor for the locomotive and a fluid pressure operated controlling means for supplying the booster motor with motive power, which controlling means is provided with a plurality of springs of graduated resistance against which the fluid pressure operates first to delay the supply of motive power to the booster motor and thereafter to apply said motive power first in small and thereafter in larger quantities.

29. In combination with the main driving means of a locomotive, a booster motor for the locomotive and controlling mechanism for the booster operated by the main driving means, said controlling mechanism comprising means whereby the operation of the controlling mechanism is delayed until the main driving means of the locomotive is in operation.

30. In combination with the main driving means of a locomotive, a booster motor for the locomotive normally disentrained therefrom, and controlling mechanism for the booster motor operated by the main driving means which when the main driving means is put into operation entrains the booster motor with the locomotive and thereafter supplies the same with motive power first in small and afterwards in larger quantities.

31. In combination with the main driving means of a locomotive and its reverse lever and throttle valve, a steam actuated booster motor normally disentrained from the locomotive and having a throttle valve, and controlling mechanism for the booster motor which operates when the reverse lever is put into an extreme position to entrain the booster motor with the locomotive and when the throttle valve of the main driving means is opened to open the booster throttle to admit steam to the booster first in small and afterwards in larger quantities.

32. In combination with the main driving means of a locomotive and its reverse lever and throttle valve, a steam actuated booster motor normally disentrained from the locomotive and having a throttle valve, controlling mechanism for the booster motor which operates when the reverse lever is put into an extreme position to entrain the booster motor with the locomotive and when the throttle valve of the main driving means is opened to open the booster throttle to admit steam to the booster first in small and afterwards in larger quantities, and means whereby the opening of the booster throttle valve is momentarily delayed.

33. In combination with the locomotive booster motor and its throttle valve, a fluid pressure actuated element for opening the same which when subjected to fluid pressure operates said valve to admit steam to the booster motor first in small and thereafter in larger quantities.

34. The combination with a locomotive booster motor and its throttle valve, of a fluid pressure actuated device comprising a cylinder, a piston and a plurality of springs of graduated resistance against which the piston is adapted to be thrust whereby steam is admitted to the booster motor first in small and thereafter in larger quantities.

35. The combination with a locomotive booster motor and its throttle valve, of a fluid pressure actuated device comprising a cylinder, a piston, a follower having operating connections with said valve, a spring interposed between the piston and follower, and a pair of springs of greater resistance and one of greater resistance than the other, which springs are adapted to be compressed successively by movement of the follower in the direction to open said valve.

36. The combination with a locomotive booster motor and its throttle valve comprising a main and an auxiliary valve, of a fluid pressure actuated device comprising an element subject to fluid pressure on one side thereof, and two springs of different resistances on the other side of said element arranged so that when the spring of lesser resistance is compressed the auxiliary valve is opened and when the other spring is compressed the main valve is opened.

37. The combination with a locomotive booster motor and its throttle valve comprising a main and an auxiliary valve, of a fluid pressure actuated device comprising an element subject to fluid pressure on one side thereof, and three springs of different resistances arranged so that the lightest spring is compressed without moving the valve, the auxiliary valve is opened when the spring next in size is compressed, and the main valve opened when the heaviest spring is compressed.

38. In combination with a locomotive having a steam dome, a booster motor for the locomotive, a throttle valve for the booster located in the steam dome and provided with an auxiliary valve, and a controlling device arranged outside of the steam dome having operating connections extending into said dome for first opening the auxiliary valve and thereafter the main valve.

39. A booster throttle valve operating motor comprising a cylinder, a piston in the cylinder, a follower provided with valve operating connections, and a pair of springs of different resistance adapted to be successively compressed by movement of the follower when the piston is moved by application thereto of fluid pressure.

40. A booster throttle valve operating motor comprising a cylinder, a piston in the cylinder, a follower provided with valve operating connections, a pair of springs of different resistance adapted to be successively compressed by movement of the follower when the piston is moved by application thereto of fluid pressure, and a lighter spring interposed between the piston and follower.

41. A booster throttle valve operating motor comprising a cylinder 61, 62, 63 having ports 166, 167, 168, 169, a piston 65, a follower 74, springs 77 and 80, operating connections between the follower and valve, and check valves 153, 155 operated by said piston.

42. A booster throttle valve operating motor comprising a cylinder 61, 62, 63 having ports 166, 167, 168, 169, a piston 65, a follower 74, springs 77 and 80, operating connections between the follower and valve, check valves 153, 155 operated by said piston, and a spring 69 interposed between the piston and follower.

43. A controlling device for governing the application of a pressure fluid to the throttle valve operating motor of a locomotive booster engine comprising, in combination, a steam cylinder and piston, and a spring compressed when a relative movement takes place between the piston and cylinder; said piston and cylinder being formed so that the movable one of said elements has a greater area subject to steam pressure when said element is moved away from the other element than when said elements are in their normal positions.

44. A controlling device for governing the application of a pressure fluid to the throttle valve operating motor of a locomotive booster engine comprising, in combination, a steam cylinder and piston formed so that with a slight movement of one of said elements with respect to the other steam will pass around the movable element, for the purpose described.

45. A controlling device for governing the application of a pressure fluid to the throttle valve operating motor of a locomotive booster engine comprising, in combination, a steam cylinder and piston formed so that with a slight movement of one of said elements with respect to the other steam will pass around the movable element, while with full travel of the movable element the piston and cylinder are in sealing relation with each other.

46. A controlling device for governing the application of a pressure fluid to the throttle valve operating motor of a locomotive booster engine comprising, in combination, the casing members 110, 113, 114, the latter provided with ducts 149, 151 and valves 127, 128, piston 115 having face 116 of reduced diameter and spring 124 compressed when the piston is moved by steam pressure.

47. A controlling device for governing the application of a pressure fluid to the throttle valve operated motor of a locomotive booster engine comprising in combination. the casing members 110, 113, 114, the latter provided with ducts 149, 151 and valves 127, 128, piston 115 having face 116 of reduced diameter and spring 124 compressed when the piston is moved by steam pressure, the casing member 113 being formed with a duct 118 and exhaust port 134, piston 115 with duct 133, and casing member 114 with exhaust port 135.

48. A booster engine entraining motor comprising in combination, a piston having inlet and outlet ducts for pressure fluid, and a cylinder movable with respect to said piston provided with a by-pass which when said cylinder is moved by introduction of fluid pressure therein connects the space therein under fluid pressure with said outlet duct.

49. A booster engine entraining motor comprising, in combination, a piston having inlet and outlet ducts for pressure fluid, a cylinder movable with respect to said piston provided with a by-pass which when said cylinder is moved by introduction of fluid pressure therein connects the space therein under fluid pressure with said outlet duct, and a spring stressed when the cylinder is moved by the pressure fluid.

50. A booster engine entraining motor comprising, in combination, a piston having inlet and outlet ducts for pressure fluid, a cylinder movable with respect to said piston provided with a by-pass which when said cylinder is moved by introduction of fluid pressure therein connects the space therein under fluid pressure with said outlet duct, a spring stressed when the cylinder is moved by the pressure fluid, and a port leading from said outlet duct to the atmosphere.

51. A booster engine entraining motor comprising piston 22, 23, 27, formed with ducts 35, 38, 44 and 36, movable cylinder 24, 25 formed with by-pass 42 and spring 29 interposed between the cylinder and the spring abutment 30.

In testimony whereof, I have hereunto signed my name.

HOWARD L. INGERSOLL.